(12) United States Patent
Kwon et al.

(10) Patent No.: US 8,970,804 B2
(45) Date of Patent: Mar. 3, 2015

(54) LIQUID CRYSTAL PANEL AND LIQUID CRYSTAL DISPLAY DEVICE USING THE SAME

(71) Applicant: LG Display Co., Ltd., Seoul (KR)

(72) Inventors: Han Hyuk Kwon, Gyeongsan-si (KR); Se Yong Paek, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 137 days.

(21) Appl. No.: 13/712,129

(22) Filed: Dec. 12, 2012

(65) Prior Publication Data

US 2014/0063407 A1 Mar. 6, 2014

(30) Foreign Application Priority Data

Aug. 30, 2012 (KR) .................. 10-2012-0095835

(51) Int. Cl.
```
G02F 1/1333      (2006.01)
G02F 1/1339      (2006.01)
G02F 1/1335      (2006.01)
G02F 1/1337      (2006.01)
G02F 1/1341      (2006.01)
```
(52) U.S. Cl.
CPC .......... *G02F 1/1339* (2013.01); *G02F 1/13338* (2013.01); *G02F 1/133512* (2013.01); *G02F 1/1337* (2013.01); *G02F 1/1341* (2013.01)
USPC ............. 349/58; 349/106; 349/190; 349/123; 349/110

(58) Field of Classification Search
CPC ...................................................... G02F 1/1339
USPC .............. 349/58, 123, 106, 190, 110; 359/49
See application file for complete search history.

(56) References Cited

U.S. PATENT DOCUMENTS

| | | | | |
|---|---|---|---|---|
| 2004/0212555 | A1* | 10/2004 | Falco | 345/50 |
| 2005/0280754 | A1* | 12/2005 | Kume et al. | 349/106 |
| 2007/0153119 | A1* | 7/2007 | Bilbrey | 348/373 |
| 2010/0315570 | A1* | 12/2010 | Mathew et al. | 349/58 |
| 2011/0134255 | A1* | 6/2011 | Kim et al. | 348/207.1 |
| 2011/0261283 | A1* | 10/2011 | Kim et al. | 349/58 |
| 2012/0106063 | A1* | 5/2012 | Mathew et al. | 361/679.21 |
| 2012/0206669 | A1* | 8/2012 | Kim et al. | 349/58 |

* cited by examiner

*Primary Examiner* — Edward Glick
*Assistant Examiner* — Sang V Nguyen
(74) *Attorney, Agent, or Firm* — Brinks Gilson & Lione

(57) ABSTRACT

A liquid crystal panel and a liquid crystal display device using the same are disclosed, in which an alignment layer the same as that of a display area is formed in a light-transmitting portion of a non-display area, the light-transmitting portion being provided with a through hole. The liquid crystal panel comprises a color filter substrate; a driving device array substrate; a seal surrounding the outside of the light-transmitting portion and the display area; and a liquid crystal injected into the display area and the light-transmitting portion, which are surrounded by the seal, in a state that the driving device array substrate and the color filter array substrate are bonded to each other by the seal.

10 Claims, 9 Drawing Sheets

(a)

(b)

(a)

(b)

LIQUID CRYSTAL PANEL AND LIQUID CRYSTAL DISPLAY DEVICE USING THE SAME

CROSS REFERENCE TO RELATED APPLICATIONS

This application claims the benefit of the Korean Patent Application No. 10-2012-0095835 filed on Aug. 30, 2012, which is hereby incorporated by reference for all purposes as if fully set forth herein.

BACKGROUND

1. Field of the Disclosure

The present disclosure relates to a liquid crystal display device, and more particularly, to a liquid crystal display device having a camera therein.

2. Discussion of the Related Art

Recently, various flat panel display devices have been developed. Examples of the display devices, which have been actively studied, include a liquid crystal display device, a plasma display panel, a field emission display device, and a light emitting display device.

Of the flat panel display devices, the liquid crystal display (LCD) device is a device that displays images using optical anisotropy of a liquid crystal, and is widely used owing to its advantages of thin type, small size, low power consumption, and high picture quality.

FIG. 1 is a plane view illustrating a liquid crystal display device according to the related art, and illustrates that an upper substrate and a lower substrate are bonded to each other by a seal. FIG. 2 is an exemplary view illustrating a section in the periphery of a through hole of a liquid crystal panel according to the related art.

According to the liquid crystal display device, the upper substrate and the lower substrate are bonded to each other in a state that a liquid crystal is filled between the upper substrate and the lower substrate. A liquid crystal layer between the upper substrate and the lower substrate is sealed by seals 11e, 11m, 11n and 11p formed outside the liquid crystal panel.

The liquid crystal display device may be divided into a display area where various elements are formed to display images, and a non-display area formed outside the display area. In this case, the seals 11e, 11p, 11m and 11n may be divided into the first seal 11e formed between the first non-display area having a camera therein and the display area, and the second to fifth seals 11f, 11m, 11n, and 11p formed outside the liquid crystal display device at the non-display area of the liquid crystal display device in rectangular shapes, sealing the upper substrate and the lower substrate.

At the lower substrate of the liquid crystal display device, pixels are formed per area where a gate line crosses a data line. A liquid crystal injected into the pixel is driven by a voltage applied to a common electrode and a pixel electrode formed at the pixel, so as to vary transmittance of light.

The common electrode may be formed in the display area of the upper substrate or the lower substrate. In order to apply a common voltage to the common electrode, a common line connected with the common electrode is formed in the non-display area of the lower substrate or the upper substrate.

With the recent trend that intends to reduce an edge width of the liquid crystal display device, the common line is formed in the upper substrate to overlap the seals 11e, 11m, 11n and 11p as shown in FIG. 1, wherein the seals are attached onto the common line.

In case of the liquid crystal display device having a camera for video chatting, video conference, etc., as shown in FIG. 1, the first seal 11e formed between the first non-display area 12 and the display area 36 is extended to the first non-display area 12 to surround a through hole 14 formed in the first non-display area 12 to correspond to the camera.

In other words, in the liquid crystal display device according to the related art, light is refracted at an empty space between the lower substrate and the upper substrate where the through hole 14 is formed, whereby a diffraction pattern is generated in the image taken by the camera. In order to prevent such a diffraction pattern from being generated, a method for injecting a liquid crystal into the periphery of the through hole 14 has been used recently. To this end, the first seal 11e formed between the display area 36 and the first non-display area 12 is formed to surround the through hole 14.

Accordingly, no seal is formed between the periphery of the through hole 14 of the first non-display area 12 and the display area. For this reason, the liquid crystal injected into the display area is also injected into the periphery of the through hole 14.

An alignment layer is formed on a surface of the upper substrate and the lower substrate, which face each other, to increase an alignment power of the liquid crystal.

However, in the liquid crystal display device according to the related art, the alignment layer is formed in the display area 36 only of the upper substrate and the lower substrate, and is not formed in the non-display area 12 including the periphery of the through hole 14.

As described above, as the alignment layer is formed in the display area 36 only of the upper substrate and the lower substrate and is not formed in the non-display area 12 including the periphery of the through hole 14, problems occur as follows.

First of all, since the alignment power of the liquid crystal is not deteriorated in the periphery of the through hole 14, the liquid crystal may not be injected into or may not be uniformly injected into the periphery of the through hole 14.

Second, after thermal hardening for the seal for bonding the upper substrate to the lower substrate, the liquid crystals in the display area 36 may be shifted to the periphery of the through hole 14 which is not filled with the liquid crystal. In this case, liquid crystal alignment of the display area 36 may be distorted, whereby a defect may occur in the entire display area.

Third, as shown in (a) of FIG. 2, if rubbing is performed for an alignment material 13b, which is deposited on the display area of the upper substrate 13a, by using a roller 40, foreign materials scattered from the alignment material 13b by rubbing are scattered in the periphery of the through hole 14 located in the first non-display area 12 of the upper substrate 13a, whereby the foreign materials may be deposited on the through hole 14. In this case, noise may occur in the image taken in the liquid crystal display device.

Finally, the rubbing process for forming the alignment layer is performed on a mother substrate where a plurality of upper substrates or lower substrates are formed. In this case, a first display area of a first color filter substrate and a second display area of a second color filter substrate, where the alignment layer is formed, adjoin each other by interposing the first non-display area therebetween as shown in (b) of FIG. 2, wherein the first non-display area is provided with the through hole 14. Since the alignment material 13b constituting the alignment layer is not formed in the through hole 14 and the first non-display area 12 provided with the through hole 13, the surfaces of the alignment materials 13b formed in the two display areas are spaced apart from each other at a certain interval (for example, 12.12 mm). Also, the first non-display area 12 of the first color filter substrate arranged between the two display areas is recessed. Accordingly, if the roller 40 is shifted on the surface of the mother substrate to perform rubbing for the alignment material 13b, impact may be applied to the end A of the first display area of the second color filter substrate by the roller 40 which is moving after rubbing the first display area of the first color filter substrate. For this reason, vibration may occur in the entire of the mother substrate. This vibration may cause a defect of the alignment layer, whereby a defect of the liquid crystal display device may be caused.

SUMMARY

A liquid crystal panel comprises a color filter substrate where a first alignment layer is formed in a light-transmitting portion of a non-display area and a display area provided with a color filter, the light-transmitting portion including a through hole formed to correspond to a camera; a driving device array substrate where a second alignment layer is formed in an area corresponding to the light-transmitting portion and a display area provided with a plurality of pixels; a seal surrounding the outside of the light-transmitting portion and the display area such that the display area connects to the light-transmitting portion; and a liquid crystal injected into the display area and the light-transmitting portion, which are surrounded by the seal, in a state that the driving device array substrate and the color filter array substrate are bonded to each other by the seal.

In another aspect, a liquid crystal display device comprises a display unit that includes the liquid crystal panel; and a guide frame for supporting the display unit, wherein the guide frame includes a guide sidewall for guiding a side of the liquid crystal panel and a liquid crystal panel support portion for supporting the liquid crystal panel, a first liquid crystal panel support portion of the liquid crystal panel support portion includes a camera receiving portion to which a camera is fixed, and a black matrix fixed to the first liquid crystal panel support portion of the liquid crystal panel and formed in the light-transmitting portion of the first non-display area is provided with a through hole to allow light to be transmitted towards the camera.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EXEMPLARY EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Figure 3:
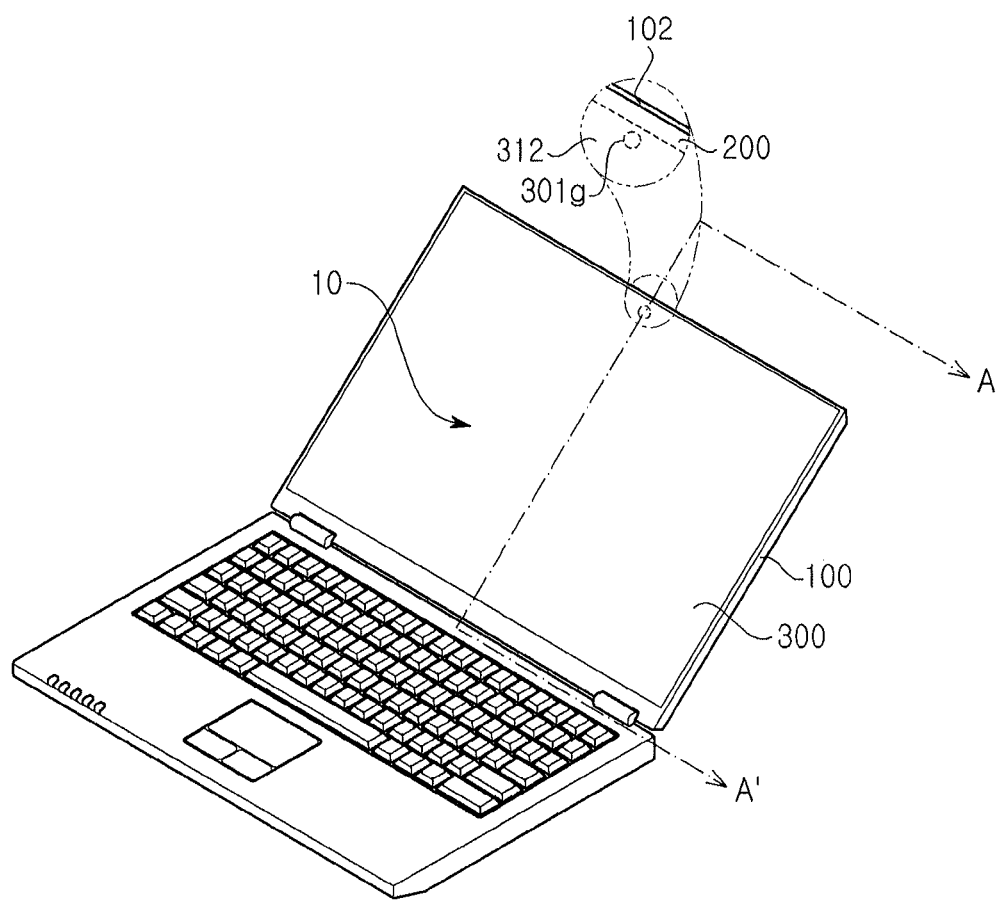
FIG. 3 is an exemplary view illustrating an example of a notebook computer to which a liquid crystal display device according to an embodiment of the present invention is applied.

FIG. 3 is an exemplary view illustrating an example of a notebook computer to which a liquid crystal display device according to the present invention is applied.

The liquid crystal display device 10 according to the present invention is built in a small sized terminal such as a notebook computer, a tablet PC and a cellular phone, and especially has a camera, which can collect images of a user, who uses a small sized terminal, wherein the camera is built below a liquid crystal panel.

Also, the liquid crystal display device 10 according to the present invention has a flat panel without step difference to obtain borderless appearance.

Figure 1:
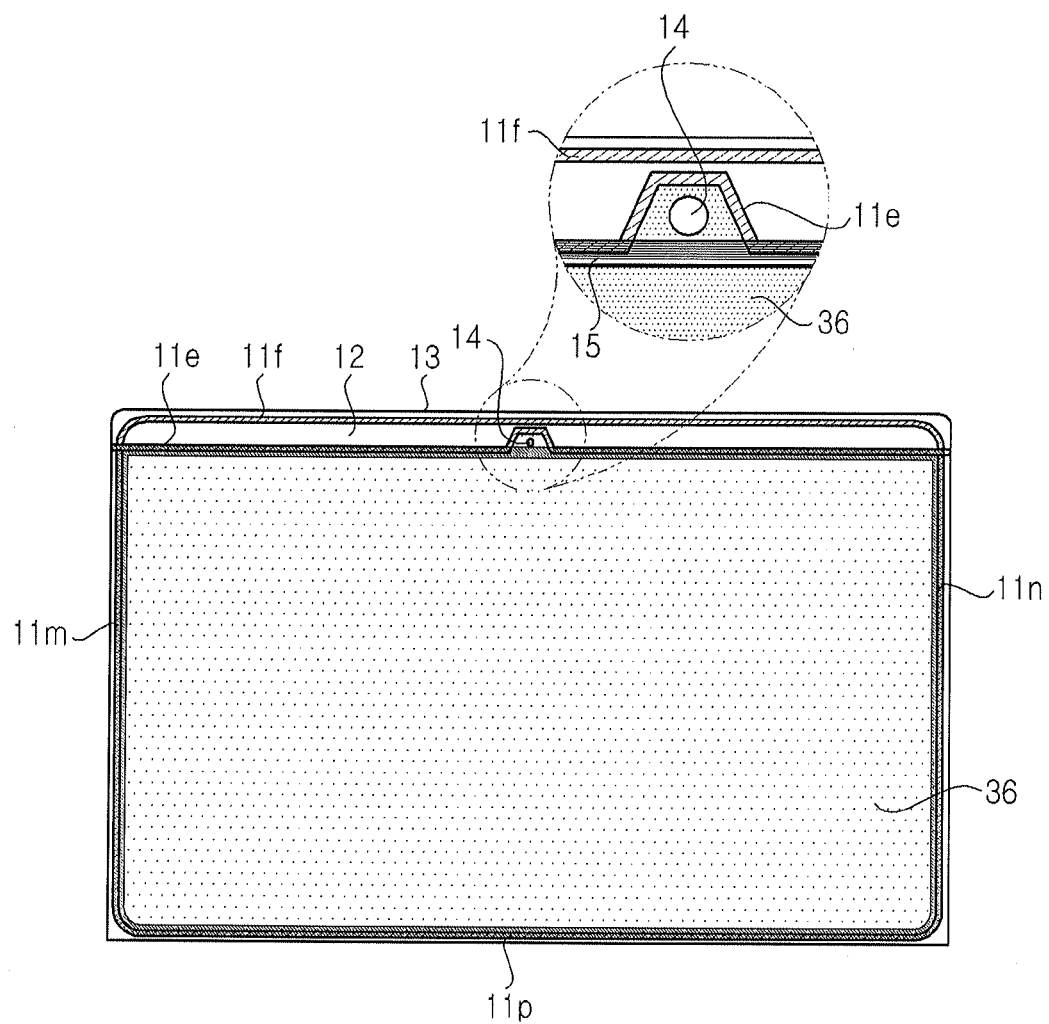
FIG. 1 is a plane view illustrating a liquid crystal display device according to the related art.
Figure 2:
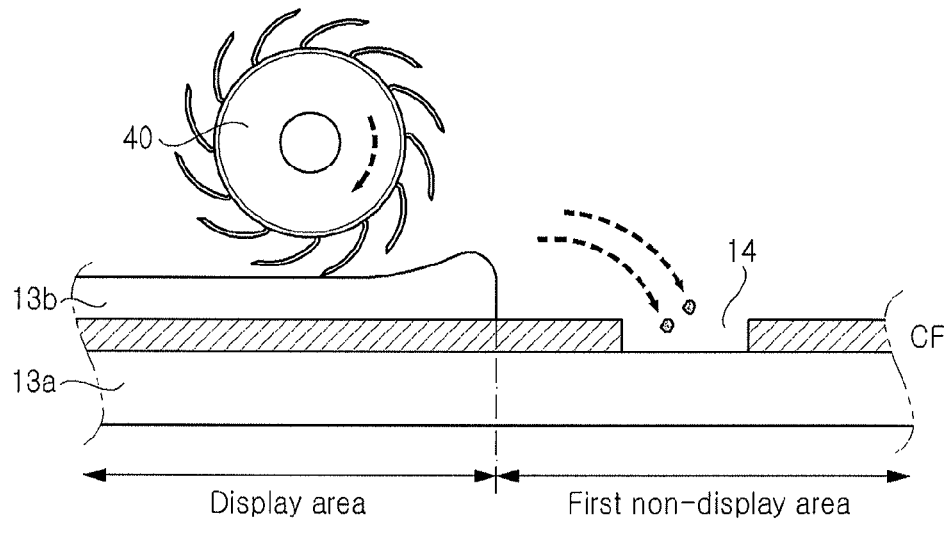
FIG. 2 is an exemplary view illustrating a section in the periphery of a through hole of a liquid crystal panel according to the related art.
Figure 2:
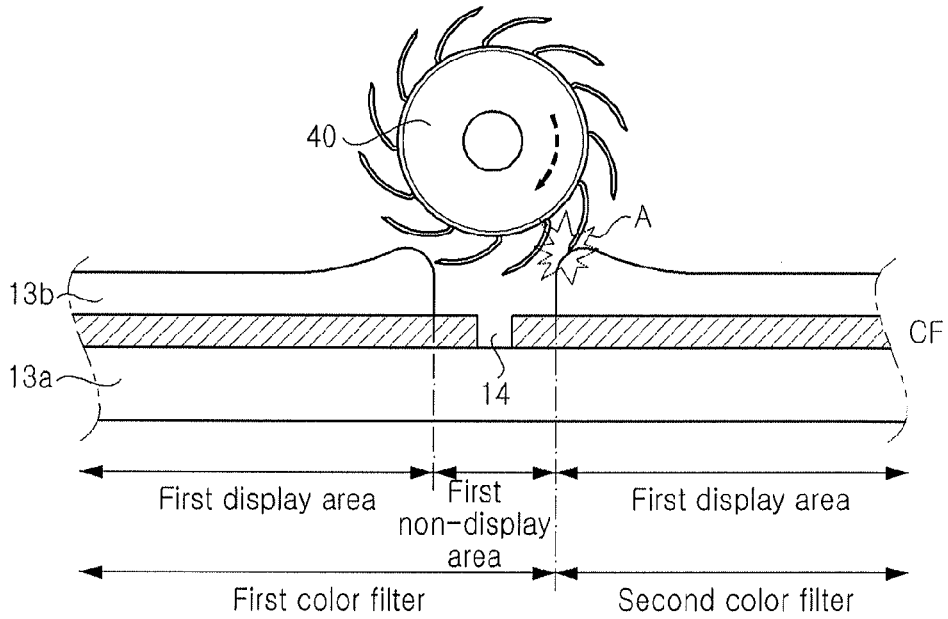

The aforementioned liquid crystal display device 10 according to the present invention may serve as a monitor of a small sized terminal as shown in FIG. 2. Meanwhile, this monitor is configured in such a manner that a set cover 100 surrounds the liquid crystal display device 10, and no step difference is formed in the flat panel of the set cover 100 and the liquid crystal display device 10.

As described above, although the liquid crystal display device 10 according to the present invention may be formed with a flat panel having no step difference, the end of the set cover may surround the outside of the flat panel in a type of a narrow bezel.

In other words, the present invention is intended to allow external light to flow into a camera lens through a through hole 301g formed in a non-display area of the liquid crystal panel. Although the end of the set cover or guide frame, which will be described later, may be configured to partially surround the non-display area of the liquid crystal panel, thereby generating step difference with a flat panel of the liquid crystal panel, the end of the set cover or guide frame and the flat panel of the liquid crystal panel may be configured so as not to generate step difference.

Accordingly, the liquid crystal display device, in which the end of the set cover or guide frame and flat panel of the liquid crystal panel are configured so as not to have step difference, will be described as one example of the present invention.

However, the present invention may be applied to the liquid crystal display device having step difference.

Also, in the present invention, the liquid crystal is injected into the through hole 301g corresponding to the camera and the periphery (hereinafter, simply referred to as 'light-transmitting portion') of the through hole. Accordingly, a diffraction pattern generated when the light-transmitting portion is a vacuum state may be avoided. In this case, the light-transmitting portion includes a two-dimensional flat panel, which forms the through hole 301g and the periphery of the through hole on the upper substrate constituting the liquid crystal panel, a three-dimensional space, which includes the two-dimensional flat panel between the upper substrate and the lower substrate, and a two-dimensional flat panel corresponding to the three-dimensional space of the lower substrate.

Figure 4:
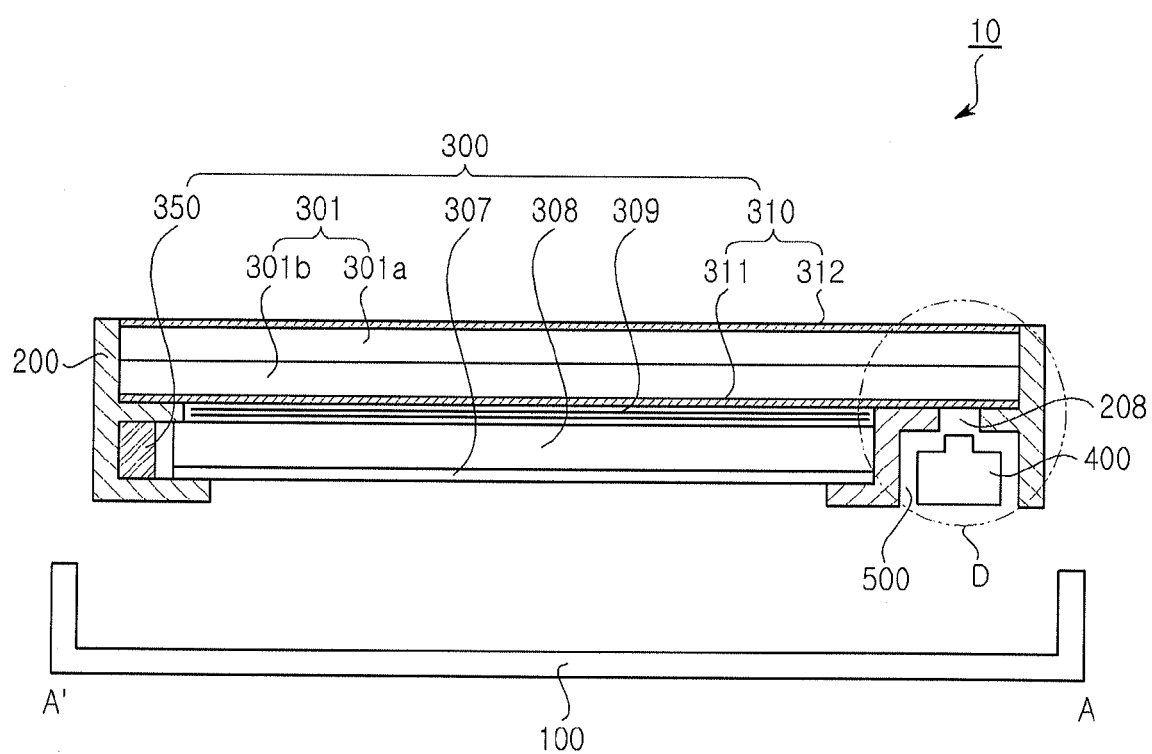
FIG. 4 is a cross-sectional view illustrating a liquid crystal display device according to an embodiment of the present invention.

FIG. 4 is a cross-sectional view illustrating a liquid crystal display device according to the present invention, taken along line A'-A of FIG. 3.

The liquid crystal display device 10 according to the present invention is built in the aforementioned small sized terminal to display images, and includes a guide frame 200 and a display unit 300 as shown in FIG. 4, and is fixed to a set cover 100. Also, a camera 400 is fixed between the set cover 100 and the guide frame 200 or between the guide frame 100 and a liquid crystal panel 301 of the display unit. In other words, the liquid crystal display device 10 according to the present invention may form a monitor of the small sized terminal in a state that it is covered with the set cover 100. Meanwhile, although the liquid crystal display device 10 according to the present invention may include the set cover 100, the liquid crystal display 10, which excludes the set cover, will be described hereinafter as the example of the present invention. In other words, the set cover 100 covers appearance of the liquid crystal display device, and may be regarded as that substantially forms appearance of the small sized terminal such as a notebook computer.

First of all, the set cover 100 is formed in a rectangular frame, and supports the guide frame 200 and covers the liquid crystal display device 10 by surrounding the side of the guide frame 200.

Next, the guide frame 200 serves to support the display unit 300, and is received in a receiving space provided in the set cover 100.

Finally, the display unit 300 may include a liquid crystal panel 301, a polarizing film 310, an optical film portion 309, a light guide plate 308, a reflecting plate 307, and a light source 350.

The liquid crystal panel 301 is configured in such a manner that an upper substrate 301a is bonded to a lower substrate 301b, and is divided into a display area where various elements are formed and a non-display area formed outside the display area. In this case, the non-display area may be divided into a first non-display area, a second non-display area, a third non-display area and a fourth non-display area. The first non-display area means an area where the through hole 301g corresponding to a camera and a camera hole 208 are formed, and the second non-display area means an area that faces the first non-display area, and the third non-display area and the fourth non-display area mean areas respectively arranged at both sides of the first non-display area and the second non-display area.

The aforementioned liquid crystal panel 301 outputs images depending on transmittance of light emitted from the light source 350 by driving the liquid crystal injected between the upper substrate and the lower substrate using a voltage applied to the lower substrate.

The light source 350 is to supply light to the liquid crystal panel 301. Although various types of light sources may be used, a light emitting diode (LED) may recently be used as the light source.

The light guide plate 308 serves to guide light emitted from the light source 350 towards the liquid crystal panel 301 by diffusing and reflecting the light. In other words, the light guide plate 308, as shown in FIG. 4, is provided in a side light type liquid crystal display device in which the light source 350 is formed at a side, and serves to reflect light emitted from the light source towards the liquid crystal panel.

The optical film portion 309 serves to diffuse the light that has passed through the light guide plate 308 or allow the light that has passed through the light guide plate 308 to vertically enter the liquid crystal panel, and its examples may include a diffuser sheet and a prism sheet.

The reflecting plate 307 is provided on the bottom of the light guide plate and serves to reflect the light emitted from the light source towards the liquid crystal panel. In other words, the light emitted from the light source and entering the light guide plate is refracted by a pattern formed at the light guide plate 308 and then reflected towards the liquid crystal panel. However, the light may be emitted to the outside through the bottom of the light guide plate without being reflected, and in this case, the reflecting plate 307 serves to again reflect the light and guide the reflected light towards the liquid crystal panel.

The polarizing film 310 includes an upper polarizing film 312 and a lower polarizing film 311. The polarizing film 310 is attached to the flat panel or the bottom of the liquid crystal panel that includes a liquid crystal, and serves to pass through only light of a desired direction component of the light emitted from the light source.

Although the side light type display unit in which the light source is arranged at the side of the liquid crystal panel has been described as above, the display unit applied to the present invention may be configured in a direct light type in which the light source is arranged below the liquid crystal panel.

The present invention is characterized in the structure of the liquid crystal panel 301 of the display unit. Hereinafter, details of the liquid crystal panel and the liquid crystal display device using the same according to the present invention will be described with reference to FIG. 5 to FIG. 10.

Figure 5:
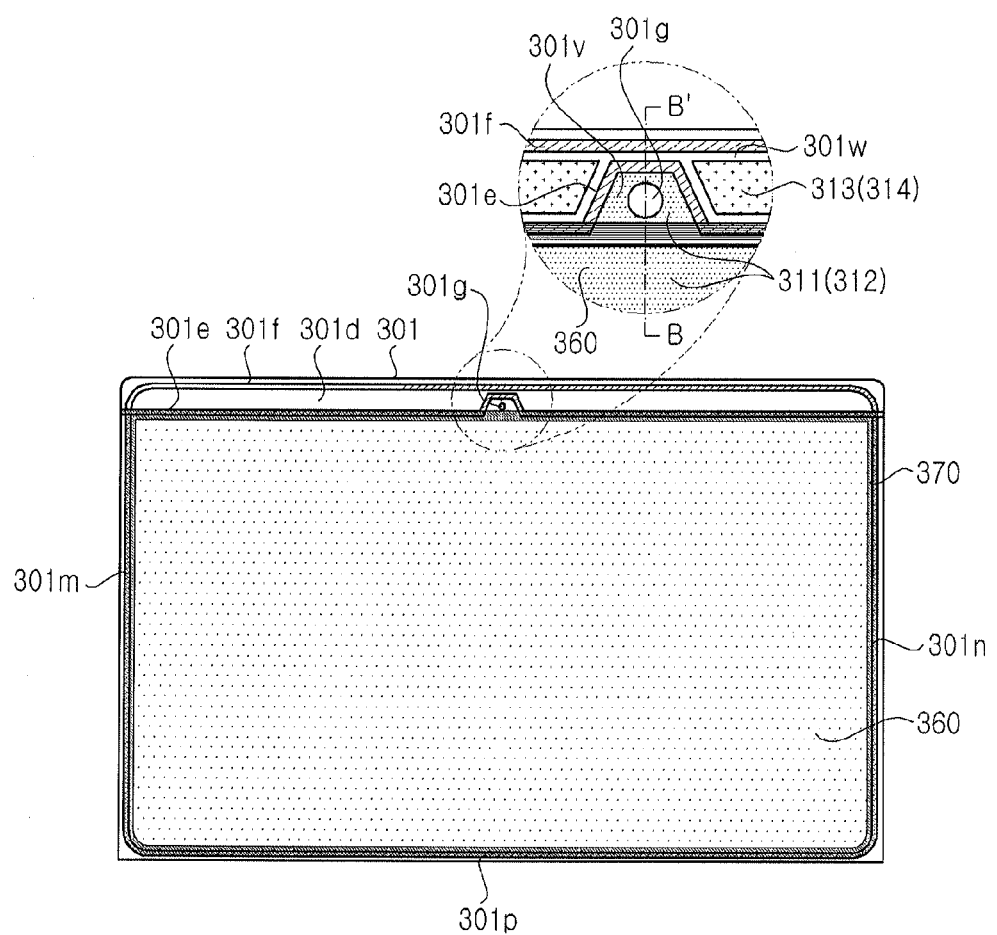
FIG. 5 is a plane view illustrating a liquid crystal panel according to an embodiment of the present invention.
Figure 6:
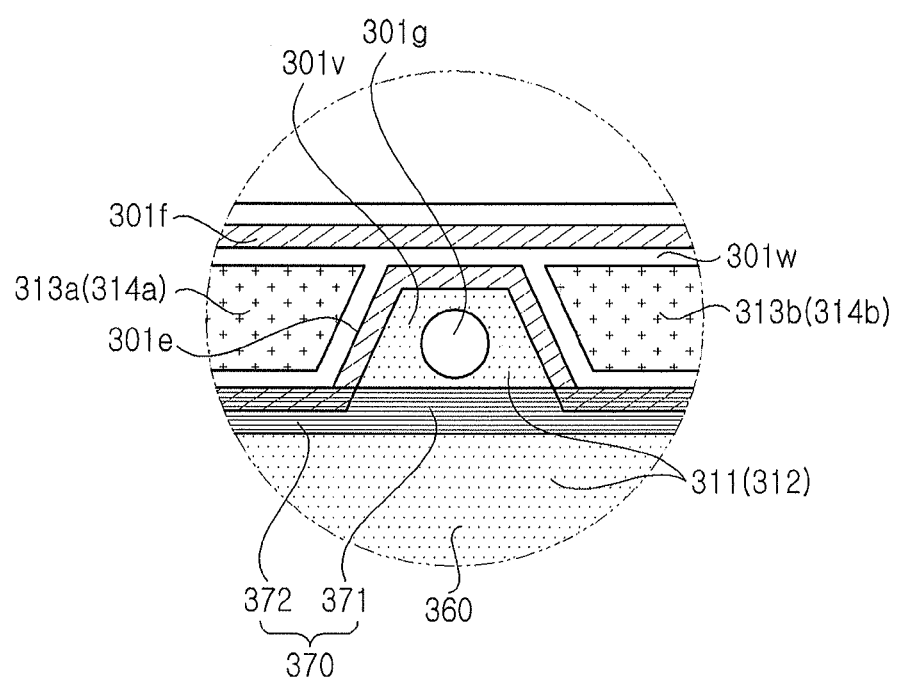
FIG. 6 is a detailed exemplary view illustrating an alignment layer shown in FIG. 5.
Figure 7:
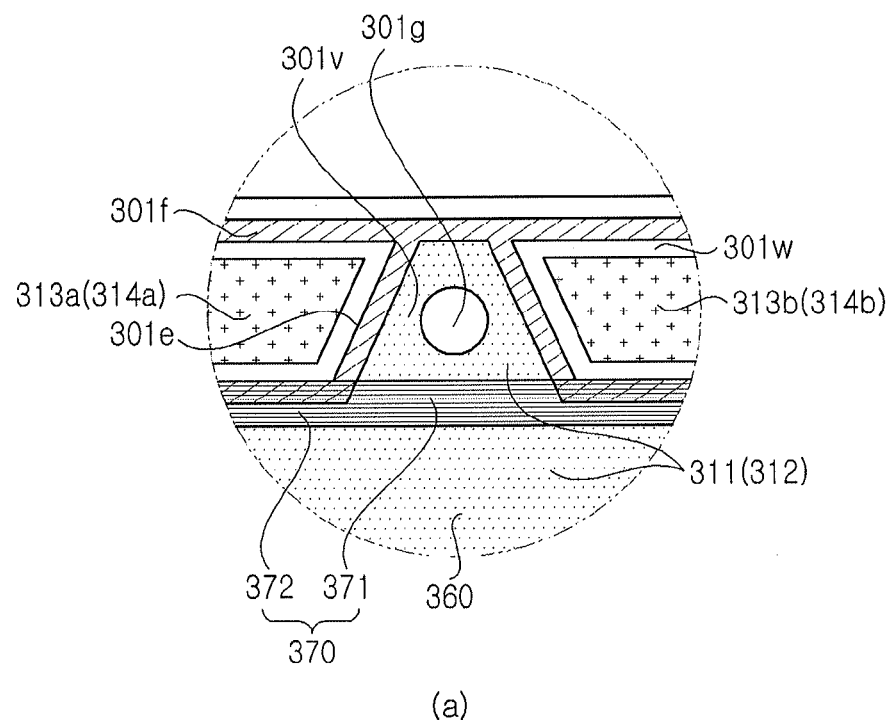
FIG. 7 is an exemplary view illustrating various examples of seals surrounding a light-transmitting portion applied to a liquid crystal panel according to an embodiment of the present invention.
Figure 7:
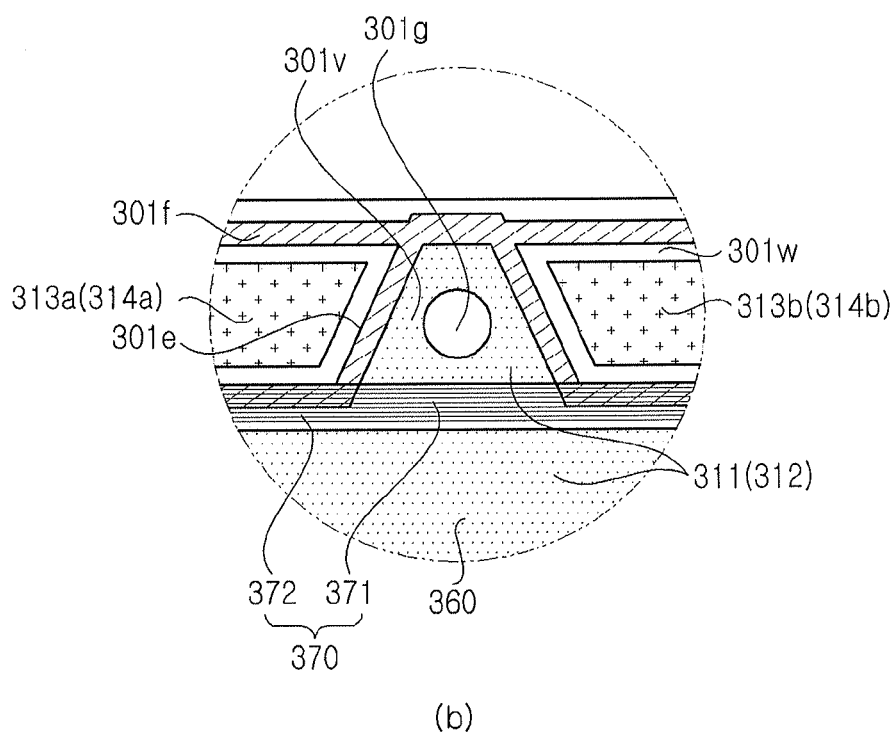

FIG. 5 is a plane view illustrating a liquid crystal panel according to the present invention, especially a flat panel of the liquid crystal panel 301 of the liquid crystal display device shown in FIG. 4. FIG. 6 is a detailed exemplary view illustrating an alignment layer shown in FIG. 5. FIG. 7 is an exemplary view illustrating various examples of seals surrounding a light-transmitting portion applied to a liquid crystal panel according to the present invention.

In the liquid crystal panel 301 according to the present invention, the upper substrate 301a and the lower substrate 301b are bonded to each other in a state that the liquid crystal is filled between the upper substrate 301a and the lower substrate 301b. The liquid crystal layer between the upper substrate and the lower substrate is sealed by seals formed outside the liquid crystal panel 301.

In other words, the liquid crystal panel 301 according to the present invention includes a color filter substrate where a first alignment layer 311 is formed in a display area 360 provided with a color filter and a light-transmitting portion 301v, which includes a through hole 301g formed at a position of the non-display area to correspond to the camera, a driving device array substrate where a second alignment layer 312 is formed in a display area 360 provided with a plurality of pixels and an area corresponding to the light-transmitting portion 301v, seals 301e, 301m, 301n and 301p surrounding the outside of the light-transmitting portion and the display area to pass through the display area 360 and the light-transmitting portion 301v, and a liquid crystal injected into the display area 360 and the light-transmitting portion 301v, which are surrounded by the seals, in a state that the driving device array substrate and the color filter substrate are bonded to each other by the seals.

The liquid crystal panel 301 may be divided into the display area 360 where various elements are formed to display images, and the non-display area formed outside the display area, as described above. In this case, the seals may be divided into second to fifth seals 301f, 301m, 301n and 301p formed outside the liquid crystal panel in the non-display area of the liquid crystal panel in rectangular shapes, sealing the upper substrate and the lower substrate, and a first seal 301e formed between the first non-display area 301d and the display area 360.

The second to fifth seals 301f, 301m, 301n and 301p are formed at the outmost of four sides of the liquid crystal panel, that is, at the outmost of the entire liquid crystal panel, and the first seal 301e is formed on the border of the display area 360 and the first non-display area 301d of the liquid crystal panel.

The first non-display area 301d is provided with the through hole 301g from which a black matrix is removed, to allow the light from the outside to enter a lens of the camera.

The first seal 301e may be configured to surround the light-transmitting portion 301v as shown in the enlarged circle of FIG. 5. In other words, the light-transmitting portion 301v is disconnected from a portion 301w (hereinafter, simply referred to as 'side portion') except for the light-transmitting portion 301v of the first non-display area 301d, and is connected with the display area 360.

Accordingly, if the liquid crystal is filled into the liquid crystal layer between the upper substrate and the lower substrate which are sealed by the first seal 301e and the third to fifth seals 301m, 301n and 301p, the light-transmitting portion 301v is also filled with the liquid crystal. At this time, the side portion 301w is sealed by the first seal 301e and the second seal 301f in a vacuum state.

The reason why the light-transmitting portion 301v is filled with the liquid crystal as described above is to offset a diffraction pattern of a concentric circle type, which is caused by diffraction of light that has passed through the through hole 301g, by using scattering properties of the liquid crystal.

In other words, the concentric circle type diffraction pattern occurring on the image taken by the camera and spectrum Mura occurring on appearance of the liquid crystal panel are generated by diffraction of light that has passed through the through hole 301g. According to the present invention, this problem is solved using scattering of the liquid crystal in such a manner that the light-transmitting portion 301v between the through hole 301g and the camera lens is filled with the liquid crystal.

In particular, since the liquid crystal has a refractive index (n=1.54) similar to a refractive index (n=1.51) of a glass, which constitutes the upper substrate 301a and the lower substrate 301b, the diffraction phenomenon may be more reduced. For this reason, the diffraction pattern on the image and spectrum Mura on the entire surface of the liquid crystal panel may be more reduced.

The first seal 301e surrounding the light-transmitting portion 301v may be formed in various types in addition to the types shown in FIG. 5 and FIG. 6.

In other words, the light-transmitting portion 301v may be spaced apart from the second seal 301f and surrounded by the first seal 301e as shown in FIG. 5 and FIG. 6. The light-transmitting portion 301v may be surrounded by the first seal 301e and the second seal 301f as shown in (a) of FIG. 7, and may be surrounded by the first seal 301e and the second seal 301f, which is overlapped with the first seal 301e, as shown in (b) of FIG. 7.

A common line 370 is formed at a portion of the lower substrate 301b, which is overlapped with the first seal 301e and the third to fifth seals 301m, 301n and 301p. The common line 370 serves to apply a common voltage to a common electrode formed in the upper substrate 301a or the lower substrate 301b. Hereinafter, for convenience of description, the liquid crystal panel where the common electrode is formed in the upper substrate will be described as an example of the present invention. In other words, the common line 370 is connected with a common voltage generator (not shown), which generates a common voltage, and is connected with the common electrode through a contact hole, etc.

The common line 370 includes a first common line 371 formed between the light-transmitting portion 301v and the display area, and a second common line 372 formed outside the display area to overlap the seal.

The first common line 371 is formed between the light-transmitting portion 301v of the non-display area of the driving device array substrate, which includes the upper substrate 301a, and the display area 360 of the driving device array substrate, wherein the light-transmitting portion 301v is formed to correspond to the camera arranged below the driving device array substrate.

The second common line 372 is formed between the first non-display area 301d of the non-display area, which is provided with the light-transmitting portion 301v, and the display area 360, and is connected with the common electrode formed in the color filter substrate, which includes the lower substrate 301b, or the driving device array substrate, and is also connected with both ends of the first common line.

The first seal 301e is formed on the second common line 372 to overlap the second common line 372, and surrounds the light-transmitting portion 301v. The other seals except for the first seal 301e surround the outside of the display area 360. In this case, the second common line 372 may be formed to overlap the other seals except for the first seal 301e.

The color filter substrate is provided with the first alignment layer 311 formed in the light-transmitting portion 301v, which includes the through hole 301g formed at the position of the non-display area to correspond to the camera, and the display area 360 provided with the color filter. The driving device array substrate is provided with the second alignment layer 312 formed in the area corresponding to the light-transmitting portion 301v and the display area 360 where a plurality of pixels are formed.

Since the first alignment layer 311 and the second alignment layer 312 are formed on the color filter substrate or the driving device array substrate to reach the display area 360 and the light-transmitting portion 301v, foreign materials formed at the ends of the alignment layers are not deposited on the through hole 301g or the light-transmitting portion 301v during a rubbing process for the first alignment layer 311 or the second alignment layer 312. For this reason, noise caused by the foreign materials does not occur in the images taken by the camera through the light-transmitting portion 301v.

The side portion 301w formed inside the light transmitting portion 301v of the first non-display area 301d of the color filter substrate is provided with a third alignment layer 313, as shown in FIG. 5, while the side portion 301w formed inside the light-transmitting portion 301v of the first non-display area 301d of the driving device array substrate may be provided with a fourth alignment layer 314.

The first alignment layer 311 and the second alignment layer 312 may prevent the foreign materials from being deposited on the through hole 301g or the light-transmitting portion 301v. However, when the rubbing process for the alignment layer is performed on the mother substrate, vibration may occur between two different color filter substrates (or driving device array substrates) adjacent to each other by interposing the first non-display area provided with the light-transmitting portion 301v.

In order to prevent vibration from occurring, according to the present invention, the third alignment layer 313 and the fourth alignment layer 314 are formed in the other portion (side portion 301w) except for the light-transmitting portion 301v of the first non-display area 301d, as described above.

The interval between the first alignment layers 311 or between the second alignment layers 312, which are formed on two color filter substrates or two driving device array substrates adjacent to each other on the mother substrate, is reduced by the third alignment layer 313 and the fourth alignment layer 314.

Accordingly, if a roller is shifted on the surface of the mother substrate to perform rubbing for the alignment layers, impact applied to the end of the display area of the second color filter substrate is reduced by the roller which is moving after rubbing the display area of the first color filter substrate. For this reason, vibration may be prevented from occurring in the entire of the mother substrate.

The third alignment layer 313 is spaced apart from the first alignment layer 311 formed on the color filter substrate, and the fourth alignment layer 314 is spaced apart from the second alignment layer 312 formed on the driving device array substrate. The first seal 301e is attached to the portion where the third alignment layer 313 is spaced apart from the first alignment layer 311 and the portion where the fourth alignment layer 313 is spaced apart from the second alignment layer 312.

In other words, the aforementioned alignment layers are formed of a material such as polyimide (PI), which does not have good contact with the seal. Accordingly, if the third alignment layer 313 and the fourth alignment layer 314 are formed continuously with the first alignment layer 311 and the second alignment layer 312, the contact power of the seal is reduced, wherein the seal is in contact with the color filter substrate and the driving device array substrate between the alignment layers. In order to prevent the contact power of the seal from being reduced, according to the present invention, the first alignment layer 311 is spaced apart from the third alignment layer 313, and the second alignment layer 312 is spaced apart from the fourth alignment layer 314, so that the seal is not in contact with the alignment layers.

The third alignment layer 313 and the fourth alignment layer 314 are sealed by the first seal 301e and the second seal 301f, wherein the first seal 301e surrounds the display area and the light-transmitting portion, and the second seal 301f is formed outside the color filter substrate and the driving device array substrate.

The third alignment layer 313, as shown in FIG. 6, may be divided into a first left alignment layer 313a and a first right alignment layer 313b on the border of the light-transmitting portion 301v, and the fourth alignment layer 314 may be divided into a second left alignment layer 314a and a second alignment layer 314b on the border of the light-transmitting portion 301v. Also, the first left alignment layer 313a and the first right alignment layer 313b may be spaced apart from each other, and the second left alignment layer 314a and the second right alignment layer 314b may also be spaced apart from each other.

For example, in case of the liquid crystal panel shown in FIG. 6, two side portions 301w formed at both sides of the light-transmitting portion 301v form one space through the first seal 301e and the second seal 301f. Accordingly, although the first left alignment layer 313a and the first right alignment layer 313b may be connected with each other, they may be spaced apart from each other as shown in FIG. 5. Also, the second left alignment layer 314a and the second right alignment layer 314b may be connected with each other, or may be spaced apart from each other.

Further, in the liquid crystal panel shown in (a) of FIG. 7 and the liquid crystal panel shown in (b) of FIG. 7, since the first seal 301e and the second seal 301f are connected with each other, the two side portions 301w are spaced apart from each other. Accordingly, in this case, the first left alignment layer 313a and the first right alignment layer 313b have no option but to be spaced apart from each other, and the second left alignment layer 314a and the second right alignment layer 314b have no option but to be spaced apart from each other.

Figure 8:
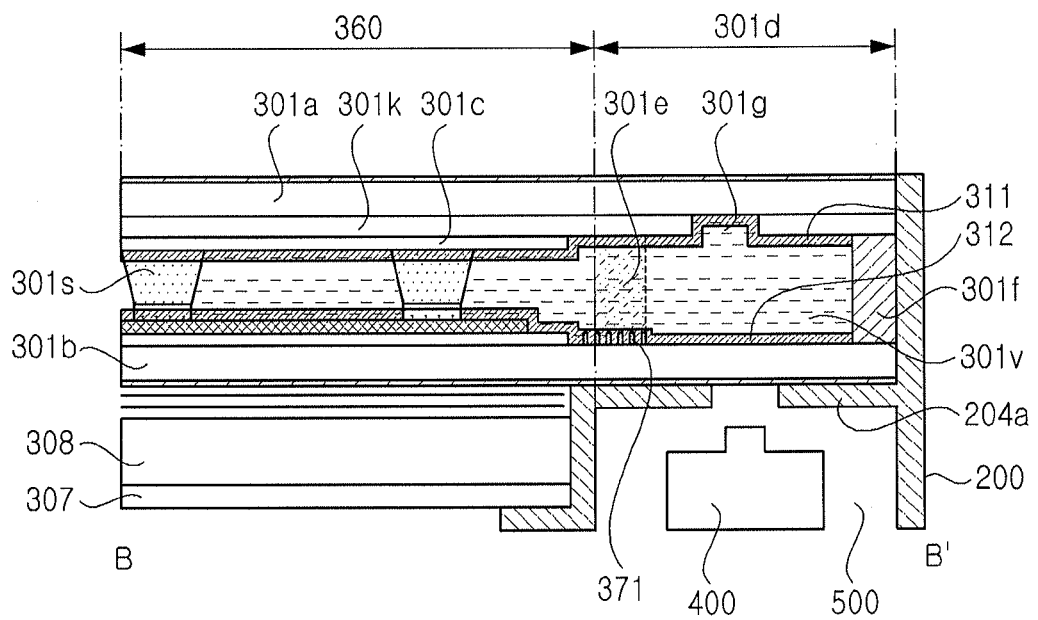
FIG. 8 is a detailed cross-sectional view illustrating a liquid crystal display device according to an embodiment of the present invention.
Figure 9:
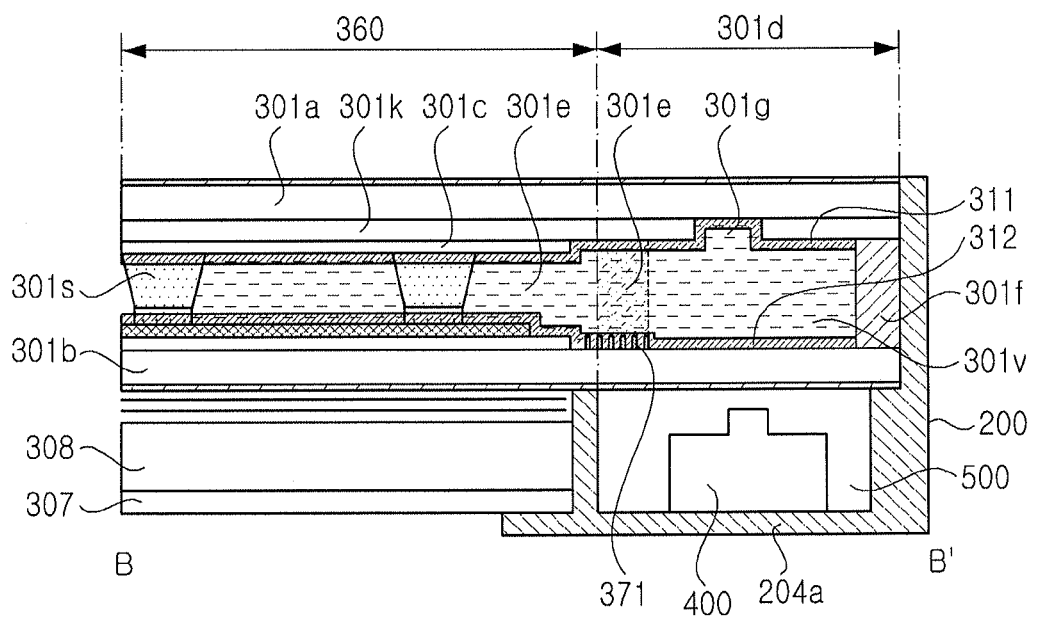
FIG. 9 is another detailed cross-sectional view illustrating a liquid crystal display device according to an embodiment of the present invention.

FIG. 8 is a detailed cross-sectional view illustrating a liquid crystal display device according to the present invention, and in more detail illustrates a portion D shown in FIG. 4 and the section taken along line B-B' of FIG. 5. FIG. 9 is another detailed cross-sectional view illustrating a liquid crystal display device according to the present invention, and in more detail illustrates a portion D shown in FIG. 4 and the section taken along line B-B' of FIG. 5.

First of all, the liquid crystal panel 301 includes an upper substrate 301a, a lower substrate 301b, and a liquid crystal layer formed between the upper substrate and the lower substrate.

The lower substrate 301b is a base substrate constituting the driving device array substrate. Although not shown in detail, the lower substrate is provided with a plurality of pixels, each of which includes a driving device such as a thin film transistor.

The upper substrate 301a is a base substrate constituting the color filter substrate, and is provided with a color filter layer for displaying color.

Also, a pixel electrode is formed in the lower substrate 301b, and a common electrode is formed in the lower substrate or the upper substrate. The first to fourth alignment layers 311, 312, 313 and 314 for aligning liquid crystal molecules of the liquid crystal layer is deposited on the lower substrate and the upper substrate. Hereinafter, for convenience of description, the liquid crystal display device in which the common electrode is formed in the upper substrate 301a will be described as an example of the present invention.

The lower substrate 301b and the upper substrate 301a are bonded to each other by the second seal 301f and the third to fifth seals 301m, 301n and 301p, which are formed outside the substrates. A given cell gap is maintained by a spacer 301s formed between the lower substrate and the upper substrate.

The liquid crystal panel 301 configured as above drives the liquid crystal through a driving device formed in the lower substrate 301b, and displays information by controlling the amount of light that transmits the liquid crystal layer.

In the liquid crystal panel 301 configured as above, the lower substrate 301b is formed by a driving device array substrate process that forms the driving device, and the upper substrate 301a is formed by a color filter substrate process that forms a color filter.

The driving device array substrate process includes forming a plurality of gate lines and data lines, which define pixel areas, on the lower substrate, forming a thin film transistor which is a driving device connected with the gate lines and the data lines, in each of the pixel areas, and forming a pixel electrode which is connected to the thin film transistor and drives the liquid crystal layer as a signal is applied through the thin film transistor.

The color filter substrate process includes forming a black matrix 301k on the upper substrate 301a, forming a color filter on the black matrix 301k, and then forming a common electrode 301c.

The black matrix 301k is deposited on the upper substrate 301a of the liquid crystal panel applied to the liquid crystal display device according to the present invention, as described above. This black matrix 301k is also formed in the first non-display area of the liquid crystal panel, and the through hole 301g is formed in the black matrix 301k to correspond to the camera. The through hole 301g may be formed by an etching process of the color filter substrate process.

In other words, after the black matrix 301k, the color filter (not shown), and the common electrode 301c are deposited on the upper substrate 301a, the through hole 301g is formed by an etching process using a mask. At this time, the through hole 301g may be formed as the black matrix is etched together with the color filter or the common electrode.

Also, a spacer for uniformly maintaining a cell cap between the upper substrate and the lower substrate is formed in the common electrode 301c or planarization layer of the upper substrate 301a. Preferably, a column spacer 301s is used as the spacer. This column spacer may be formed at a desired position with the same density over the entire liquid crystal panel. In other words, as the column spacer is formed at a desired position, the cell gap between the upper substrate 301a and the lower substrate 301b is maintained uniformly, whereby an opening ratio may be prevented from being deteriorated.

Also, a projection corresponding to the column spacer may be formed in the lower substrate 301b. This projection serves to prevent a press defect from being generated when the column spacer 301s is in contact with the lower substrate 301b.

As described above, the column spacer 301s formed by being deposited on the upper substrate may directly be in contact with the lower substrate to maintain the cell gap, or may be in contact with the projection to maintain the cell gap.

In other words, the liquid crystal panel 301 is formed by bonding between the upper substrate where the column spacer 301s is formed, and the lower substrate.

In the last process for manufacturing the liquid crystal panel 301, the edge of the liquid crystal panel is sealed by the seal 301f. In this sealed state, after the liquid crystal is injected into the liquid crystal layer through a seal injection hole, the seal injection hole is finally sealed, whereby the liquid crystal panel is completed.

As another method, after the seals are dropped into a plurality of areas of the lower substrate 301b, the upper substrate 301a where the seals are formed may be bonded to the lower substrate 301b, whereby the seals may uniformly be distributed between the lower substrate 301b and the upper substrate 301a.

The liquid crystal may be injected into the display area 360 and the light-transmitting portion 301v in a state that the display area 360 and the light-transmitting portion 301v are sealed by the seals. Alternatively, the liquid crystal may be injected into the display area 360 and the light-transmitting portion 301v when the driving device array substrate is bonded to the color filter substrate by the seal after the liquid crystal is injected into the driving device array substrate in a drop type.

The present invention is characterized in that the liquid crystal is formed to reach the light-transmitting portion 301v of the first non-display area 301d, as shown in FIG. 5 to FIG. 9.

In other words, according to the present invention, the liquid crystal may be injected into the light-transmitting portion 301v of the first non-display area 301d, whereby the light-transmitting portion 301v formed in the first non-display area may be prevented from being recessed.

Also, the refractive index of the liquid crystal is closer to that of the glass than the air or vacuum. Accordingly, if the liquid crystal is injected into the liquid crystal layer of the first non-display area 301d, the diffraction phenomenon of the light-transmitting portion 301v may be prevented from being generated. For this reason, the diffraction pattern on the image taken by the camera may be prevented from being generated.

The common line 370 is formed between the first non-display area 301d of the lower substrate 301b and the display area to overlap the seal. The common line 370 serves to apply the common voltage to the common electrode formed in the upper substrate 301a or the lower substrate 301b.

The common line 370 includes the first common line 371 formed between the light-transmitting portion 301v and the display area 360, and the second common line 372 except for the first common line, as shown in FIG. 6 and FIG. 7.

Also, the display area 360 is provided with the first alignment layer 311 deposited on the color filter substrate and the second alignment layer 312 deposited on the driving device array substrate. The first alignment layer 311 is formed continuously in the display area 360 and the light-transmitting portion 301v, and the second alignment layer 312 is also formed continuously in the display area 360 and the light-transmitting portion 301v.

In other words, the first seal 301e is formed between the first non-display area 301d and the display area 360 to overlap the second common line 372 formed on the extension line of the first common line 371. Since the first seal 301e is not formed in the section B-B', it is marked with a dotted line in FIG. 8 and FIG. 9. Accordingly, in FIG. 8 and FIG. 9, the first seal 301e is in contact with the color filter substrate and the driving device array substrate by passing through the first alignment layer 311 and the second alignment layer 312, which are formed continuously in the display area 360 and the light-transmitting portion 301v.

Also, although not shown in FIG. 8 and FIG. 9, the side portions 301w formed at both sides of the light-transmitting portion 301v of the first non-display area 301d are provided with the third alignment layer 313 deposited on the color filter substrate and the fourth alignment layer 314 deposited on the driving device array substrate.

The liquid crystal display device according to the present invention as shown in FIG. 9 has the same structure as that shown in FIG. 8 and performs the same function as that shown in FIG. 8 except that a structure of a guide frame 200 provided with a camera receiving portion 500 is different from that of the guide frame 200 applied to the liquid crystal display device shown in FIG. 8.

In the guide frame 200 applied to the present invention, a panel support portion 204a that supports the first non-display area 301d may be formed in a shape of '∩' as shown in FIG. 8 or '∪' as shown in FIG. 9.

Particularly, the present invention shown in FIG. 9 is to prevent Ripple phenomenon at the liquid crystal panel from being generated due to contact with the panel support portion 204a.

In other words, according to the present invention shown in FIG. 9, since the panel support portion 204a is formed in a shape of '∩', the light-transmitting portion 301v is not in contact with the panel support portion 204a. For this reason, interference between the first non-display area and the panel support portion 204a does not occur. Accordingly, Ripple phenomenon does not occur.

Hereinafter, a method for manufacturing a liquid crystal display device according to the present invention will be described with reference to FIG. 10.

Figure 10:
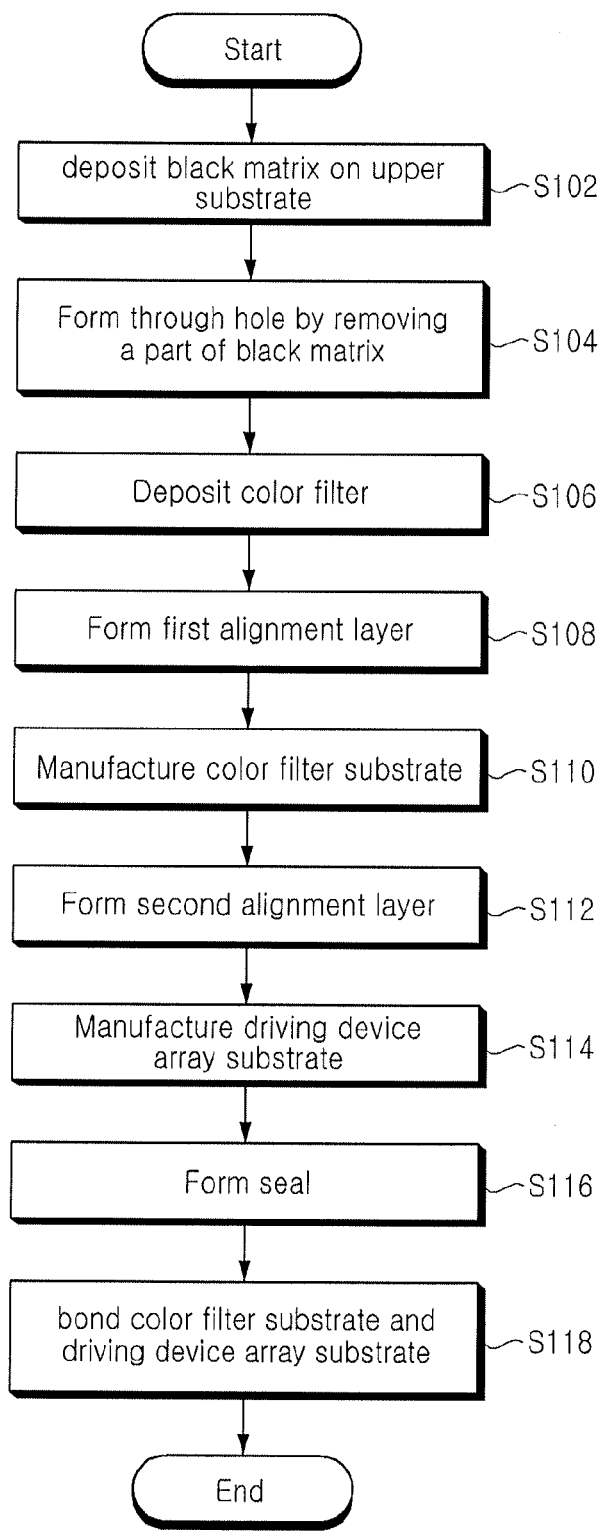
FIG. 10 is a flow chart illustrating a method for manufacturing a liquid crystal display device according to an embodiment of the present invention.

FIG. 10 is a flow chart illustrating a method for manufacturing a liquid crystal display device according to the present invention.

First of all, in order to manufacture the liquid crystal display device according to the present invention, the black matrix (BM) 301k is deposited on the upper substrate 301a (S102).

Next, from the black matrix 301k deposited on the first non-display area 301d of the upper substrate 301a, a portion of the black matrix, which corresponds to the camera lens, is removed, whereby the through hole 301g is formed (S104).

Then, R, G, B color filters and a transparent electrode for forming the common electrode are sequentially deposited on the display area of the upper substrate 301a (S106). Although the common electrode may be deposited on the display area only, it may be deposited on the non-display area, in the same manner as the color filters. Particularly, if the transparent electrode is deposited on the first non-display area 301d, a process for removing the common electrode deposited on the portion of the through hole 301g may be provided additionally. However, if the common electrode is formed of a material having a refractive index similar to that of glass, the common electrode deposited on the portion of the through hole 301g may not be removed. Also, an overcoating (OC) layer may be deposited on the display area 360 of the upper substrate 301a. The overcoating layer may be formed of an organic material, an inorganic material, or an organic and inorganic material. Generally, materials used as the overcoating layer have a refractive index similar to that of glass. Accordingly, even though the overcoating layer is deposited on the through hole of the upper substrate, an additional process for removing the overcoating layer is not required.

Next, after the first alignment layer 311 and the third alignment layer 313 are deposited in n the display area 360 of the upper substrate 301a, the light-transmitting portion 301v and the side portion 301w, a rubbing process for rubbing the surfaces of the alignment layers using a roller is performed (S108).

In this case, the first alignment layer 311 formed in the display area 360 and the light-transmitting portion 301v and the third alignment layer 313 formed in the side portion 301w may be spaced apart from each other by a mask formed in the roller or a mask arranged on the color filter substrate. Also, the third alignment layer 313 may be omitted.

Next, the color filter substrate is finally manufactured by the aforementioned steps (S110).

Afterwards, the driving device and the second and fourth alignment layers 312 and 314 are formed in the lower substrate 301b (S112).

In other words, the driving device array substrate is manufactured in such a manner that a gate electrode is formed on the lower substrate 301b, and a gate insulating film, a data line and a pixel electrode are sequentially deposited on the gate electrode. The color filter substrate and the driving device array substrate may be manufactured by their respective processes different from each other at the same time. In this case, in the lower substrate 301b, the common line 370 is formed outside the display area 360 by using the same metal material as that of the gate electrode or gate line.

Also, after the second alignment layer 312 and the fourth alignment layer 314 are deposited in n the display area 360 of the lower substrate 301b, the light-transmitting portion 301v and the side portion 301w, a rubbing process for rubbing the surfaces of the alignment layers using a roller is performed.

In this case, the second alignment layer 312 formed in the display area 360 and the light-transmitting portion 301v and the fourth alignment layer 314 formed in the side portion 301w may be spaced apart from each other by a mask formed in the roller or a mask arranged on the driving device array substrate. Also, the fourth alignment layer 314 may be omitted.

Next, the driving device array substrate 301b is finally manufactured by the aforementioned steps (S114).

Afterwards, the seal is formed in the upper substrate or the lower substrate to surround the outside of the display area 360 (S116). The seal may be formed in various types as described above. Particularly, the first seal 301e formed between the first non-display area 301d and the display area 360 is formed to surround the light-transmitting portion 301v formed in the first non-display area 301d.

Accordingly, the first seal 301e is not formed between the light-transmitting portion 301v and the display area 360, and the first common line 371 is only formed therebetween.

Finally, the color filter substrate, which includes the upper substrate, and the driving device array substrate, which includes the lower substrate, are bonded to each other using the seal (S118). As described above, after the color filter substrate and driving device array substrate are bonded to each other, the liquid crystal is injected between the color filter substrate and the driving device array substrate, whereby the liquid crystal may be formed in the display area 360. Also, after the liquid crystal is injected onto the driving device array substrate in a drop type, it may be formed in the display area 360 by bonding between the driving device array substrate and the color filter substrate.

Particularly, the liquid crystal is also injected into the light-transmitting portion 301v formed in the first non-display area 301d, as well as the display area 360. In other words, since the seal is not formed between the light-transmitting portion 301v and the display area 360, the liquid crystal injected into the display area 360 may also be injected into the light-transmitting portion 301v.

Also, since the first alignment layer 311 and the second alignment layer 312 are formed in the light-transmitting portion 301v, the liquid crystal injected into the display area 360 may be injected into the light-transmitting portion 301v more desirably.

Also, since the side portion 301w formed in the third alignment layer 313 and the fourth alignment layer 314 is spaced apart from the display area by the first seal 301e, the liquid crystal injected into the display area cannot be injected into the side portion 301w. Accordingly, the liquid crystal is not injected into the side portion 301w where the third alignment layer 313 and the fourth alignment layer 314 are formed.

As described above, the liquid crystal panel and the liquid crystal display device using the same according to the present invention have the following advantages:

Since the same alignment layer as that of the display area is formed in the light-transmitting portion of the non-display area, foreign materials may be prevented from being deposited on the light-transmitting portion during the rubbing process.

Also, since the alignment layer is formed in the light-transmitting portion, the liquid crystal may desirably be injected into the light-transmitting portion, whereby a spot may be prevented from being generated in the periphery of the light-transmitting portion.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal panel comprising:
   a color filter substrate where a first alignment layer is disposed in a light-transmitting portion of a non-display area and a display area provided with a color filter, the light-transmitting portion including a through hole corresponding to a camera;
   a driving device array substrate where a second alignment layer is in an area corresponding to the light-transmitting portion and a display area provided with a plurality of pixels;
   a seal surrounding the outside of the light-transmitting portion and the display area such that the display area connects to the light-transmitting portion; and
   a liquid crystal injected into the display area and the light-transmitting portion, which are surrounded by the seal, in a state that the driving device array substrate and the color filter array substrate are bonded to each other by the seal,
   wherein a third alignment layer is formed in a side portion of the first non-display area of the color filter substrate, the side portion being formed at both sides of the light-transmitting portion, and a fourth alignment layer is formed in a side portion of the first non-display area of the driving device array substrate, the side portion being formed at both sides of the light-transmitting portion.

2. The liquid crystal panel of claim 1, wherein the liquid crystal is injected into the display area in a state that the display area and the light-transmitting portion are sealed by the seal, and then is injected into the display area and the light-transmitting portion.

3. The liquid crystal panel of claim 1, wherein the liquid crystal is injected into the display area and the light-transmitting portion when the driving device array substrate is bonded to the color filter substrate by the seal after the liquid crystal is injected into the driving device array substrate in a drop type.

4. The liquid crystal panel of claim 1, wherein the third alignment layer is spaced apart from the first alignment layer formed in the color filter substrate, and the fourth alignment layer is spaced apart from the second alignment layer formed in the driving device array substrate.

5. The liquid crystal panel of claim 4, wherein the seal is attached to the spacing portion between the third alignment layer and the first alignment layer and the spacing portion between the fourth alignment layer and the second alignment layer.

6. The liquid crystal panel of claim 4, wherein the third alignment layer and the fourth alignment layer are sealed by the seal surrounding the display area and the light-transmitting portion and another seal formed outside the color filter substrate and the driving device array substrate.

7. The liquid crystal panel of claim 1, wherein the third alignment layer is divided into a first left alignment layer and a first right alignment layer on the border of the light-transmitting portion, and the fourth alignment layer is divided into a second left alignment layer and a second alignment layer on the border of the light-transmitting portion.

8. The liquid crystal panel of claim 7, wherein the first left alignment layer and the first right alignment layer are spaced apart from each other, and the second left alignment layer and the second right alignment layer are spaced apart from each other.

9. The liquid crystal panel of claim 1, wherein a common line is formed outside the display area of the driving device array substrate to overlap the seal.

10. A liquid crystal display device comprising:
    a display unit that includes the liquid crystal panel comprising:
       a color filter substrate where a first alignment layer is disposed in a light-transmitting portion of a non-display area and a display area provided with a color filter, the light-transmitting portion including a through hole corresponding to a camera;
       a driving device array substrate where a second alignment layer is in an area corresponding to the light-transmitting portion and a display area provided with a plurality of pixels;
       a seal surrounding the outside of the light-transmitting portion and the display area such that the display area connects to the light-transmitting portion; and
       a liquid crystal injected into the display area and the light-transmitting portion, which are surrounded by the seal, in a state that the driving device array substrate and the color filter array substrate are bonded to each other by the seal; and
    a guide frame for supporting the display unit,
    wherein the guide frame includes a guide sidewall for guiding a side of the liquid crystal panel and a liquid crystal panel support portion for supporting the liquid crystal panel, a first liquid crystal panel support portion of the liquid crystal panel support portion includes a camera receiving portion to which a camera is fixed, and a black matrix fixed to the first liquid crystal panel support portion of the liquid crystal panel and formed in the light-transmitting portion of the first non-display area is provided with a through hole to allow light to be transmitted towards the camera, and
    wherein a third alignment layer is formed in a side portion of the first non-display area of the color filter substrate, the side portion being formed at both sides of the light-transmitting portion, and a fourth alignment layer is formed in a side portion of the first non-display area of the driving device array substrate, the side portion being formed at both sides of the light-transmitting portion.

* * * * *